United States Patent [19]

Espy et al.

[11] Patent Number: 5,922,077
[45] Date of Patent: Jul. 13, 1999

[54] FAIL-OVER SWITCHING SYSTEM

[75] Inventors: James W. Espy, Andover; Scott Bleiweiss, Upton, both of Mass.; Robert C. Solomon, Kensington, N.H.; Brian K. Bailey, Shrewsbury; Peter Everdell, Littleton, both of Mass.

[73] Assignee: Data General Corporation, Westboro, Mass.

[21] Appl. No.: 08/749,311

[22] Filed: Nov. 14, 1996

[51] Int. Cl.[6] .................................................. G06F 11/00
[52] U.S. Cl. ................................................. 714/7; 714/4
[58] Field of Search ..................... 395/182.02, 182.03, 395/182.04, 182.05, 182.07, 182.09, 182.11, 441, 183.19, 185.09, 183.18; 711/114

[56] References Cited

U.S. PATENT DOCUMENTS

| | | | |
|---|---|---|---|
| 4,371,754 | 2/1983 | De et al. | 179/18 |
| 4,594,709 | 6/1986 | Yasue | 395/182.02 |
| 4,627,055 | 12/1986 | Mori et al. | 395/182.09 |
| 4,958,273 | 9/1990 | Anderson et al. | 395/812.09 |
| 5,003,531 | 3/1991 | Farinholt et al. | 395/182.02 |
| 5,155,845 | 10/1992 | Beal et al. | 395/182.04 |
| 5,168,443 | 12/1992 | McLaughlin et al. | 395/182.09 |
| 5,202,887 | 4/1993 | Ueno et al. | 371/10.1 |
| 5,212,785 | 5/1993 | Powers et al. | 395/575 |
| 5,343,477 | 8/1994 | Yamada | 371/8.2 |
| 5,485,576 | 1/1996 | Fee et al. | 395/185.09 |
| 5,487,062 | 1/1996 | Yanagi et al. | 370/16.1 |
| 5,515,501 | 5/1996 | LaBerge et al. | 395/182.08 |
| 5,544,330 | 8/1996 | Bither et al. | 395/182.02 |
| 5,544,339 | 8/1996 | Baba | 395/182.04 |
| 5,546,535 | 8/1996 | Stallmo et al. | 395/183.16 |
| 5,548,711 | 8/1996 | Brant et al. | 395/182.03 |
| 5,617,425 | 4/1997 | Anderson | 395/182.03 |
| 5,651,110 | 7/1997 | Powers et al. | 395/182.05 |
| 5,655,150 | 8/1997 | Matsumoto et al. | 395/182.05 |
| 5,668,943 | 9/1997 | Attanasio et al. | 395/182.056 |

FOREIGN PATENT DOCUMENTS 0751464  1/1997  European Pat. Off. .

WO 91/13399  9/1991  WIPO .
WO 97/07458  2/1997  WIPO .

OTHER PUBLICATIONS

"In–Depth Fibre Channel Arbitrated Loop", R.W. Kembel, *Northwest Learning Associates for Solution Technology.*
Ciprico Annual Report, 1995.
Ciprico Disk Arrays, Product Description, 1995.
CLARiiON, Data General Corporation, Product Description, 1995.
"Disk Servers and RAID", A Comparative Overview from Computing Edge, Computing Edge Corporation, 1996.
"Tandem Expands Leading Fault–Tolerant Unix(r) Systems Offerings and Adds Complementary Servers and Workstations", Tandem Computers, Inc., Oct. 18, 1996. http://www.tandem.com/press–releases/integrity.html.
Integrity S4000 Servers: CO Models, Tandem Computers, Inc., Sep. 1995. http://www.tandem.com/INFOCTR/PROD_DES/ITS4COPD/ITS4COPD.HTM.
Fibre Channel Association. http://www.Amdahl.com/ext/CARP/FCA/FCA.html.

(List continued on next page.)

*Primary Examiner*—Joseph Palys
*Attorney, Agent, or Firm*—Bromberg & Sunstein LLP

[57] ABSTRACT

A recovery method and fail-over switch for use in a data storage system in which a plurality of data storage devices are connected to each of two communication paths. The switch may route requests to either of the two communication paths. Switching may be accomplished by two fail-over switches connected to each other and each in connection with one of the two communication paths. With one data storage controller in communication with the data storage devices over a first path and a second data storage controller in communication with the data storage devices over a second path, the fail-over switches may be used upon detection of a malfunction on one path to switch a controller into connection with the remaining operable path so as to share that path with the other controller.

33 Claims, 3 Drawing Sheets

OTHER PUBLICATIONS

"Channel Networking: Networking Flexibility with Channel Speeds Using . . . ", Fibre Channel. http://www.ancor.com/chnlnet.htm.

"High Availability: Stayin'Alive —High availability storage clusters offer customers near fault tolerance and offer VARs better margins than RAID", Peter Jordan, Apr. 15, 1996, 1996 CMP Publications, Inc. http://192.216.191.76/cg . . . =125596&CO_CD=4&CO_TXT=Y.

"Disk Array Reliability is Improving", Ann Miller, CMP Media, Inc., May 23, 1994, http://192.216.191.76/cg . . . =125888&CO_CD=1&CO_TXT=Y.

"Fibre Channel: The Digital Highway Made Practical", Tim Sutton, David Webb, Oct. 22, 1994, Seagate Technology Paper. http://www.seagate.com/s . . . r/fibchan/fibchant-p.html.

"Fibre Channel–Arbitrated Loop Active Hub", FCL1063TW, Product Description. http://www.gadzoox-.com/FCL1063.htm.

Meltek FC–Array, Product Description. http://www.meltek.com/fibre/fca.html.

"Data Storage Just Got 10×Faster –Introducting Box Hill's Fibre Box™", Oct. 1996 Silicon Alley, Product Description. http://www.boxhill.com/fibrebox/press.html.

BEHAVIORAL DIAGRAM

FAIL-OVER SWITCHING SYSTEM

TECHNICAL FIELD

The present invention relates to having redundant communication pathway loops in a data storage system such that if one communication pathway becomes disabled, communications may be routed over an alternate pathway. In particular, the invention includes a fail-over switch in a system having multiple storage device controllers separately communicating over the redundant loops such that if a loops becomes disabled, the affected data storage device controller may re-route its communications by sharing the alternate loop.

BACKGROUND OF THE INVENTION

The present invention relates to providing access to redundant pathways connected to a plurality of data storage devices. There are many well-known methods in the prior art for effecting such redundant access. For example, a fibre channel arbitrated loop has been designed for use on two communication loops connected to a plurality of data storage devices. Each loop is typically independently controlled, and in systems offering high-availability of the storage devices, the system may compensate for failed components. There are many different solutions in the prior art for allowing such high-availability, but these solutions have focused upon having redundant disks, so that a disk may be hot-swapped if it fails, as well as redundant controller cards, processors, power supplies, fans, etc. that may be hot-swapped with a new unit if the old one fails. These solutions do not address the problem of a communication path that fails, while the controlling hardware remains intact. Such a problem may occur if the physical cable connection is pulled loose, breaking one of the fibre loops in a dual-loop fibre channel system. One conventional solution is to require that a secondary data storage controller handle the input/output processing of data requests through a redundant path to replace the primary controller attached to the now-defunct communication path.

Information relating to the fiber-channel architecture may be found in American National Standards Institute (ANSI) standard X3.232-1994 promulgated by ANSI Committee X3T9.3 on Fibre Channel. This reference is incorporated herein by reference.

SUMMARY OF THE INVENTION

The present invention may be used to provide high-availability to data storage devices. Preferred embodiments of the invention focus on allowing the interconnection of a pair of data storage controllers, each of which is connected to a separate communication path, and in which each path is in communication with an array of data storage devices. The data storage devices each have a communication port for receiving each communication path being utilized by the invention. In this embodiment, if the first communication path is unable to communicate the data request to a storage device, the first fail-over switch may route the data request over the second communication path.

In preferred embodiments, a fail-over switch has several components. There is an incoming data terminal for receiving a data request for transmission to the plurality of storage devices; an outgoing data terminal for receiving a response to the data request; a transmission terminal for communicating, over the first communication path, the data request to the plurality of storage devices; a response terminal for receiving, over the first communication path, data from the plurality of storage devices; a bypass-transmission terminal for communicating, over the second communication path, the data request to the plurality of storage devices; a bypass-response terminal for receiving, over the second communication path, data from the plurality of storage devices; and a switch that individually and selectively connects the first and second communication paths to the other terminals. In preferred embodiments, the switch has a first bypass switch for selectively connecting the incoming data terminal to the transmission terminal or to an intermediate node, and a second bypass switch for selectively connecting the intermediate node to the bypass-transmission terminal or to the outgoing data terminal.

In a particular embodiment, the first and the second communication paths are configured as loops, where the data traveling on the loop is in one direction around the loop. In this embodiment, the first fail-over switch has a transmission and a response terminal, and a bypass-transmission and a bypass-response terminal, so that the first path loop begins and ends with the transmission and response terminals, and the second path loop begins and ends with the bypass-transmission and bypass-response terminals.

In a further embodiment, there are two fail-over switches, each in communication with one of the communication paths, as well as with each other. Preferably each switch has an incoming and outgoing port, and the first and the second communication paths are configured as loops that begin and end with these ports of the first and second fail-over switches. There are also two data storage controllers, one connected to each of the fail-over switches, where all data requests for a particular path would be made through the data storage controller attached to that path. Preferably, communications between the controllers and the switches would be over two serial pathways, where the first serial pathway is connected to an incoming terminal, and the second serial pathway is connected to an outgoing terminal. In this preferred embodiment, the first and second fail-over switches are connected so that a data request may be selectively routed through the first fail-over switch over the first communication path, or through the first and second fail-over switches to the second communication path. In this embodiment, the data storage controllers also function as routers so as to connect the outgoing terminal of the second switch to the incoming terminal of the second switch and loop data received from the first switch back to the second switch's transmission terminal. Similarly, responses to the forwarded request may be routed back to the first switch's outgoing terminal when received from the second communication path.

The two data storage controllers of the system have a direct communication connection between them. If communications along one of the communication paths to the storage devices is disrupted, the data storage device controllers would communicate directly to request permission to share the remaining active communication path. Once authorized, the fail-over switches would be configured to route communications from each of the storage controllers over the active communication path. The present invention advantageously permits both storage controllers to continue operating despite loss of one of the communication paths, thus providing high-availability to the data storage devices without having to utilize complex and costly fibre channel concentrators/hubs.

Other objects and advantages of the invention will become apparent during the following description of the presently preferred embodiments of the invention taken in conjunction with the drawings.

DETAILED DESCRIPTION OF PREFERRED EMBODIMENTS

It is intended that a data storage system will be configured with storage devices, where each storage device is connected to multiple different communication pathways. Data controllers are assigned to specified data storage devices and one of the pathways. The data controller handles data requests and responses respectively to and from the assigned storage devices over that pathway. It is contemplated that the present invention will act as a bridge between the communication pathways such that if one pathway fails, then the affected data controller will be able to route its data requests over another available pathway. Thus the present invention may be used to provide high-availability of a plurality of data storage devices. In preferred embodiments, the storage devices have two communications ports for connection to two pathways. In alternate embodiments, a multiplexing protocol may be used to allow connecting multiple communication paths to a connection port.

Figure 1:
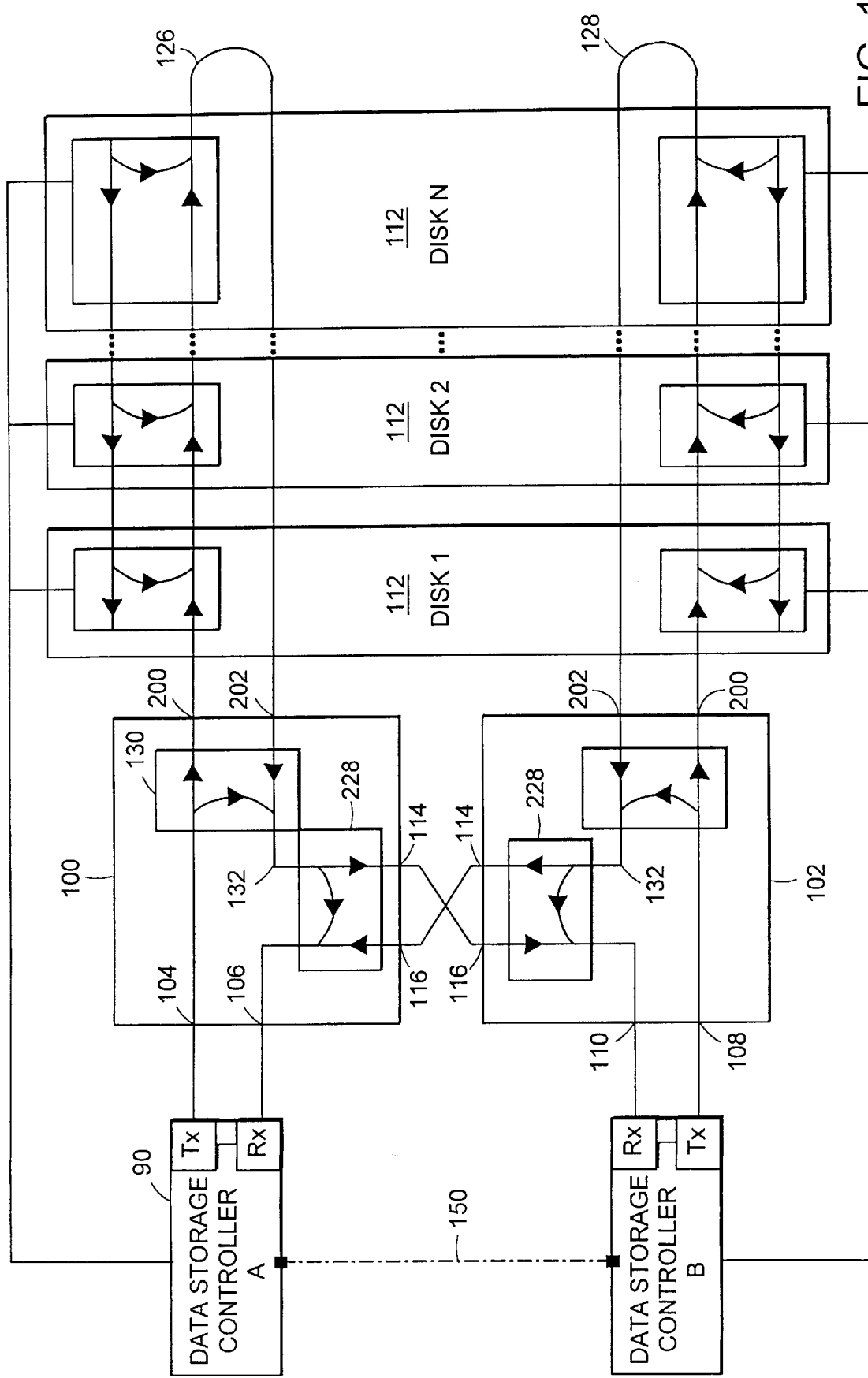
FIG. 1 is a schematic block diagram of a fail-over switching system of the present invention.

FIG. 1 shows a preferred embodiment of the present invention as configured from the interconnection of two fail-over switches 100, 102. In a preferred embodiment, there is a dedicated data storage controller 90, 92 for each fail-over switch, where the dedicated controller processes all data requests intended for the communication path to which the fail-over switch is attached, and where the controller may configure the fail-over switch to utilize its bypass terminals. Data requests for a data storage device 112 can be sent by the first data storage controller 90 to a first incoming terminal 104 on the first fail-over switch 100 for transmission over a first communication path 126. In preferred embodiments, the first communication path is a loop in which data travels serially from point-to-point in a single direction around the loop. Data requests for a different data storage device 112 may be sent by the second data storage controller 92 on a second incoming terminal 108 for transmission over a second communication path 128. In preferred embodiments, the second communication path is also a loop. The first and second communication paths may connect to numerous data storage devices limited by the speed of the path and the desired system speed. With a current Fibre Channel loop over one hundred data storage devices could be connected. Typically, the first data storage controller and the second data storage controller are assigned to different storage devices to avoid arbitration and contention issues.

The data storage controllers 90, 92 receive responses to their requests respectively from the switches' outgoing terminals 106, 110. Each fail-over switch has a transmission terminal 200 and a response terminal 202 for connection to opposite ends of the communication path loop. The fail-over switches may advantageously be switched to provide an alternate connection to an alternate loop. Each of the fail-over switches include a bypass-transmission terminal 114 and a bypass-response terminal 116 for completing the alternate connection. The bypass terminals of the two switches are cross-wired to each other so that the bypass-transmission terminal of one switch is connected to the bypass-response terminal of the other. If communication of the first data storage controller 90 over the first communication path 126 is interrupted, the data storage controllers may communicate with each other through a direct peer-to-peer communication link 150. The second data storage controller connected to an active communication path will diagnostically check the first data storage controller to ascertain whether the problem being experienced is actually the malfunction of the data storage controller rather than of its communication pathway. Only if the data storage controller checks out satisfactorily will the first switch 100 be directed to bypass its ordinarily assigned communication path and to route data requests through the second switch 102. Once communications have been re-routed, then both data storage controllers will be operating over the second communication path 128. The switches can handle the failure of either communication path, switching the data storage controllers both into connection with the remaining active path.

In accordance with the presently preferred embodiment, each fail-over switch includes two port bypass circuits. Under normal circumstances, a first bypass circuit 130 connects the first incoming terminal 104 to the transmission terminal 200. The response terminal 202 is connected to an intermediate node 132. A second bypass circuit 228 connects the intermediate node 132 to the outgoing terminal 106. Thus, communications of the data storage controller 90 take place over the first communication path 126.

When the first communication path 126 is being bypassed, the first port bypass circuit 130 severs the communication link between the first incoming terminal 104 and the transmission terminal 200. The first incoming terminal 104 is connected to the intermediate node 132. The data request received on the incoming terminal 104 is routed through the intermediate node 132 of the switch to the bypass-transmission terminal 114. The bypass-terminal 114 is connected to the second switch's 102 incoming bypass-response terminal 116. The data received upon the bypass-response terminal 116 is transmitted to the outgoing terminal 110 of the second data storage controller, and this data is automatically routed back to the incoming terminal 108 of the second controller. The automatic routing is practiced in the presently preferred embodiment in accordance with the protocol of the Fibre Channel arbitrated loop. Based upon the Fibre Channel protocol, devices connected to the communication pathway arbitrate for the right to transmit over the pathway. The winner of the arbitration may then send out a request to communicate with another device connected to the pathway. The requested device sends an acknowledgment and a point-to-point data path between the two devices is then formed. All other devices on the pathway are required by the Fibre Channel specification to passively forward any data communications not intended for them, in effect, making all connectors to the pathway repeaters for all other connections on the pathway. In this fashion, when the first data storage controller is added to the second communication pathway 128, and the first storage controller has won an arbitration request to communicate with a data storage device, the second data storage controller passively forwards data received on the second switch's 102 outgoing terminal 110 that was not intended for it back to the incoming terminal 108. The forwarded data may then be processed upon the second communication path 128. Similarly, returning data from the second communication path 128 is directed by the second fail-over switch 102 from the response terminal 202 through the intermediate node 132 to the switch's bypass-transmission terminal 114. The bypass-transmission terminal 114 is connected to the bypass-response terminal 116 of the first switch, and the data is made available to the first data storage controller at the outgoing terminal 106.

Figure 2:
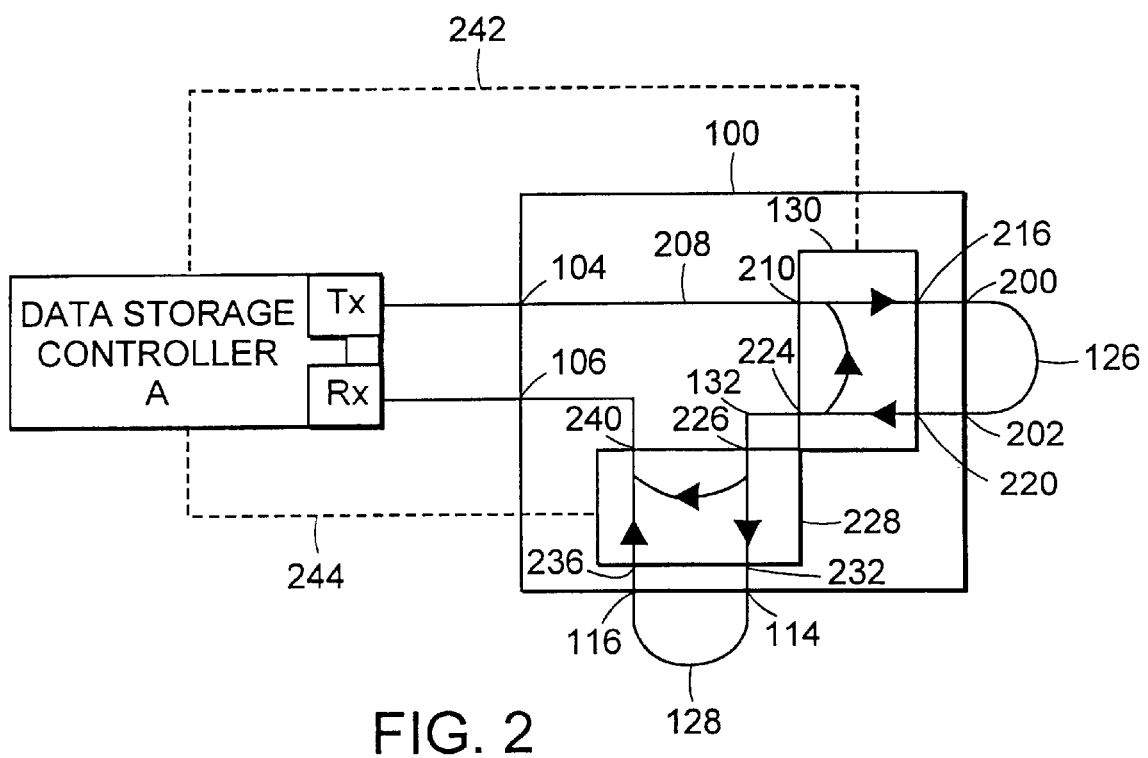
FIG. 2 is a schematic block diagram of a fail-over switching system of the present invention for use with a single data storage controller.

FIG. 2 shows the first fail-over switching system with only one data storage controller 90. The fail-over switch 100 puts the data storage controller 90 in communication with the first communication path 126 or the second communication path 128. The second communication path 128 must be routed through a second fail-over switch 102 or directly connected to the second path 128.

Data is transmitted by the first fail-over switch 100 to the first communication path from a transmission terminal 200. Data is received from the loop over response terminal 202. When the fail-over switch is in its normal state, received data is directed through the intermediate node 132 across the second port bypass circuit 228 to the outgoing terminal 106. When the fail-over switch is switched, the first port bypass circuit 130 connects the incoming terminal 104 to the intermediate node 132. Data is transmitted to the second communication path 128 from bypass-transmission terminal 114. Data is received over bypass-response terminal 116. Thus, the fail-over switch permits communications by the data storage controller to proceed over either of the first communications loop 126 or the second communication loop 128. Thus, a problem on either loop can be accommodated by switching onto the other loop.

Referring in greater detail to FIG. 2, the incoming terminal 104 is connected to a data-in port 210 of the first port bypass circuit 130. A data-out port 216 of the first port bypass circuit 130 is connected to the transmission terminal 200. The response terminal 202 is connected to a response-in port 220 of the first port bypass circuit. A response-out port 224 of the first port bypass circuit is connected to a data-in port 226 of the second port bypass circuit 228. The term intermediate node 132 as used herein refers to the connection between the two port bypass circuits 130, 228. The bypass-transmission terminal 114 is connected to a data-out port 232. The bypass-response terminal 116 is connected to the response-in port 236. A response-out port 240 is connected to the outgoing terminal 106 of the first fail-over switch 100. The state of the port bypass circuits is controlled by the data storage controller 90. Although there need not be a direct connection to accomplish the control, lines 242 and 244 are shown to represent the control by the data storage controller 90 over the fail-over switches. Various intermediate controllers may be used to carry out the instructions from the data storage controllers in alternate embodiments.

When a fail-over switch is in a switched bypass mode, communication through the incoming 104 and outgoing 106 terminals is routed through the bypass-transmission 114 and bypass-response 116 terminals instead of through the transmission 200 and response 202 terminals. As indicated hereinabove, in preferred embodiments, the transmission 200 and response 202 terminals would be in direct communication with the first communication path 126, while the bypass-transmission 204 and bypass-response 206 terminals may require communications to be routed through other hardware (e.g. the second fail-over switch 102 of FIG. 1) to reach the second communication path 128.

Figure 3B:
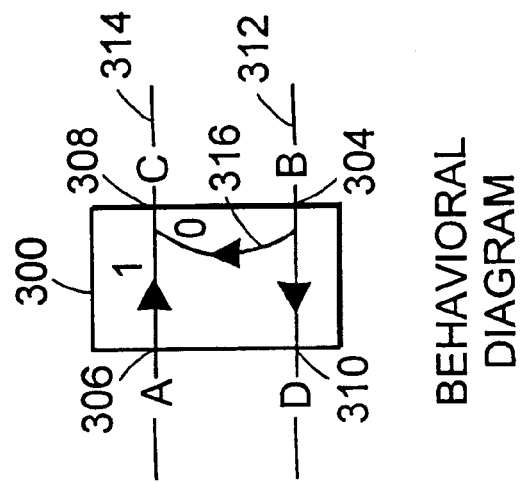
FIGS. 3a and 3b are schematic diagrams showing the circuitry and behavior respectively of a prior art port bypass circuit.
Figure 3A:
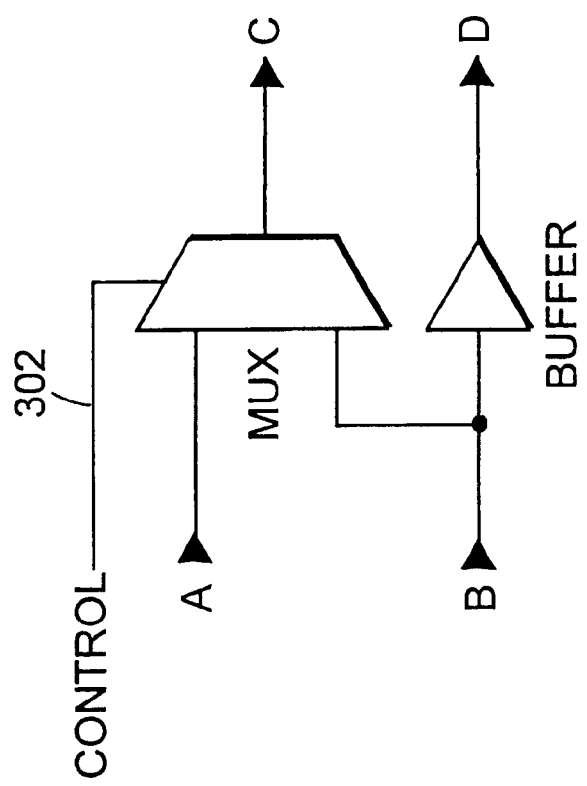

FIG. 3a shows a logical circuit diagram of a prior-art port bypass circuit 300. FIG. 3b shows a behavioral diagram of such a port bypass circuit. These port bypass circuits may be used to make the fail-over switches used in the present invention. A port bypass circuit has two modes of operation, the first being a pass-through mode, and the second being a bypass-mode. The mode is controlled by the status of a control line 302 shown in FIG. 3a. If the control line indicates the pass-through mode, then data on a data transmission line 312 connected to the switch's data-in port 304 passes through the switch to exit on the switch's data-out port 310. In pass-through mode, response data is received on the switch's response-in port 306, and this data passes through the switch to a data response line 314 that is connected to the switch's response out port 308. When the control 302 indicates the bypass-mode, then data entering the switch's data-in port 304 is routed directly to the switch's response-out port 308, thus bypassing the data-out 310 port.

Though the embodiments hereinbefore described are preferred, many modifications and refinements which do not depart from the true spirit and scope of the invention may be conceived by those skilled in the art. It is intended that all such modifications, including but not limited to those set forth above, be covered by the following claims.

What is claimed is:

1. A data storage system comprising:

a first and a second communication path;

a plurality of data storage devices, each storage device having a first and a second port respectively in communication with the first and the second communication path; and a first fail-over switch for routing a data request to the plurality of data storage devices, the first fail-over switch including
an incoming data terminal for receiving a data request for transmission to the plurality of storage devices;
an outgoing data terminal for receiving a response to the data request;
a transmission terminal for communicating, over the first communication path, the data request to the plurality of storage devices;
a response terminal for receiving, over the first communication path, data from the plurality of storage devices;
a bypass-transmission terminal for communicating, over the second communication path, the data request to the plurality of storage devices;
a bypass-response terminal for receiving, over the second communication path, data from the plurality of storage devices;
a bypass switch that selectively connects the incoming and outgoing data terminals through the transmission terminal and the response terminal or through the bypass-transmission terminal and the bypass-response terminal to only one of the first and second communication paths;

wherein if the first fail-over switch is unable to communicate the data request to a storage device over the first communication path, the first fail-over switch may be switched to route the data request over the second communication path.

2. A system according to claim 1, wherein the first communication path is a loop and the data traveling on the loop is in one direction around the loop.

3. A system according to claim 2, wherein the communication link between either data storage device port and the communication path to which it is linked further includes a port bypass circuit as part of the communication link, so as to allow the communication link to be bypassed upon operation of the port bypass circuit.

4. A system according to claim 1, the system further comprising a data storage controller in communication with the first fail-over switch, communicating with the data storage devices through the first fail-over switch.

5. A system according to claim 4, wherein the data storage controller is connected to the incoming data terminal and the outgoing data terminal on the first fail-over switch.

6. A system according to claim 1, wherein the bypass switch comprises:
   a first switch for selectively connecting the incoming data terminal to the transmission terminal or to an intermediate node; and
   a second switch for selectively connecting the intermediate node to the bypass-transmission terminal or to the outgoing data terminal.

7. A system according to claim 1, the bypass switch further comprising two port bypass circuits configured so as to have a first and a second state, where the first state allows communication between the incoming and outgoing terminals respectively with the transmission and response terminals, and where the second state allows communication between the incoming and outgoing terminals respectively with the bypass-transmission and bypass-response terminals, wherein:
   a. for the first port bypass circuit,
      i. the incoming data terminal is connected to a data-in port,
      ii. a data-out port is connected to the transmission terminal,
      iii. a response-in port is connected to the response terminal, and
      iv. the response-out port is connected to the data-in port of the second port bypass circuit; and
   b. for the second port bypass circuit,
      i. a response-in port is connected to the bypass-response terminal,
      ii. a data-out port is connected to the bypass-transmission terminal, and
      iii. a response-out port is connected to the outgoing data terminal.

8. A data storage system comprising:
   a first and a second communication path;
   a plurality of data storage devices, each storage device having a first and a second port respectively in communication with the first and the second communication path;
   a first and a second data storage controller wherein all data requests to the data storage devices are made through the data storage controllers; and
   a first and a second fail-over switch for routing data requests to the plurality of data storage devices, the first fail-over switch being in communication with the first data storage controller and the first communication path and the second fail-over switch being in connection with the second data storage controller and the second communication path;
   the first and second fail-over switches being connected to each other so that in the event of a failure on the first communication path, the first data storage controller may be disconnected from the first communication path and connected to the second communication path so that data requests from both the first and the second data storage controller are directed onto the second communication path.

9. A system according to claim 8, the system further comprising the first fail-over switch having an incoming and outgoing port, and the first and the second communication paths being configured as loops with the first communication path loop beginning and ending at the first fail-over switches and the second communication path loop beginning and ending at the second communication path loop.

10. A system according to claim 8, wherein the communication link between the data storage device port and the communication path to which the port communicates includes a port bypass circuit so as to allow the communication link to be bypassed upon operation of the port bypass circuit.

11. A system according to claim 8, wherein the communication path between the first data storage controller and the first fail-over switch comprises two pathways, the first pathway carrying signals from the first data storage controller and the second pathway carrying signals to the first data storage controller.

12. A system according to claim 8, each fail-over switch having a first and a second port bypass circuit.

13. A system according to claim 8, wherein both the first and the second fail-over switches comprise:
   a. an incoming data terminal for receiving a data request for transmission to the plurality of storage devices;
   b. an outgoing data terminal for receiving a response to the data request;
   c. a transmission terminal for communicating the data request to the plurality of storage devices, such transmission being over the first communication path for the first fail-over switch, and over the second communication path for the second fail-over switch;
   d. a response terminal for receiving data from the plurality of storage devices, such response being over the first communication path for the first fail-over switch, and over the second communication path for the second fail-over switch;
   e. a bypass-transmission terminal for communicating the data request to the plurality of storage devices, such transmission being over the second communication path for the first circuit, and over the first communication path for the second circuit;
   f. a bypass-response terminal for receiving data from the plurality of storage devices, such receipt being received over the second communication path for the first fail-over switch, and over the first communication path for the second fail-over switch;
   g. a bypass switch that individually and selectively connects the incoming and outgoing data terminals of the respective fail-over switch to either the first or the second communication path.

14. A system according to claim 13, wherein each of the bypass switches comprise:
   a. a first switch for selectively connecting the incoming data terminal to the transmission terminal or to an intermediate node; and
   b. a second switch for selectively connecting the intermediate node to the bypass-transmission terminal or to the outgoing data terminal.

15. The data storage system of claim 8 further comprising a peer-to-peer communication link connected between said first data storage controller and said second data storage controller to permit requests for access and grants of access to be communicated between the first and second data storage controllers before switching the first and second data storage controllers into communication with the same one of the first and second communication paths.

16. The data storage system of claim 15 wherein the first communication path is a loop connected to a first pair of terminals on the first fail-over switch and the second communication path is a loop connected to a second pair of terminals on the second fail-over switch.

17. A data storage system comprising:

a first single directional data loop;

a second single directional data loop;

a plurality of data storage devices connected to said first single directional data loop and said second single directional data loop;

a first fail-over switch having a transmission terminal and a response terminal connected to opposite ends of said first single directional data loop and having a bypass response terminal and a bypass transmission terminal;

a second fail-over switch having a transmission terminal and a response terminal connected to opposite ends of said second single directional data loop and having a bypass response terminal coupled to the bypass transmission terminal of said first fail-over switch and a bypass transmission terminal coupled to the bypass response terminal of said first fail-over switch;

a first data storage controller connected by two pathways to said first fail-over switch so that said first data storage controller can be added to said first single directional data loop through the transmission terminal and the response terminal of said first fail-over switch;

a second data storage controller connected by two pathways to said second fail-over switch so that said second data storage controller can be added to said second single directional data loop through the transmission terminal and the response terminal of said second fail-over switch; and wherein said first fail-over switch and said second fail-over switch may be switched so that said first data storage controller is switched out of connection with said first single directional data loop and into connection with said second single directional data loop through the bypass response terminals and the bypass transmission terminals of the first and second fail-over switches and the transmission terminal and the response terminal of said second fail-over switch.

18. The data storage system of claim 17 further comprising a peer-to-peer communication link connected between said first data storage controller and said second data storage controller.

19. A method for recovering from a malfunctioning communication path comprising the steps of:

providing a first data storage controller having communication access to a plurality of data storage devices over a first serial communication loop and a second data storage controller having communication access to the plurality of data storage devices over a second serial communication loop;

detecting a malfunction over the first communication loop;

requesting access to the second communication loop; and switching the first data storage controller into communication access with the plurality of storage devices over the second serial communication loop by uncoupling the first data storage controller from two ends of the first serial communication loop and coupling the first data storage controller with the second serial communication loop through two terminals of a switch in the second data storage controller such that the first and second data storage controllers share use of the second serial communication loop.

20. The method of claim 19 wherein said step of requesting access comprises communicating between the first data storage controller and the second data storage controller over a direct peer-to-peer communication link.

21. The method of claim 20 further comprising a step of receiving approval on the peer-to-peer communication link to access the second serial communication loop.

22. A data storage system comprising:

a first data communication loop;

a second data communication loop;

a plurality of data storage devices, each storage device having a first and a second port respectively in communication with the first and the second data communication loop;

a data storage controller; and a fail-over switch, connected to the data storage controller and to the first and the second data communication loops, for routing data requests from the data storage controller to the plurality of data storage devices through either of the first and second data communication loops, wherein if the fail-over switch is unable to communicate a given data request to a storage device over the first data communication loop, the fail-over switch may be switched to disconnect the data storage controller from the first data communication loop and connect the data storage controller to the second data communication loop so as to route the data request over the second data communication loop.

23. The data storage system of claim 22 the system further comprising the fail-over switch having a transmission and a response terminal, and a bypass-transmission and a bypass-response terminal, the first data communication loop being connected to the transmission and the response terminals, and the second data communication loop being connected to the bypass-transmission and the bypass-response terminals.

24. The data storage system of claim 23 wherein data travels around the first data communication loop in one direction out of the transmission terminal and into the response terminal and data travels around the second data communication loop in one direction out of the bypass-transmission terminal and into the bypass-response terminal.

25. The data storage system of claim 22 further comprising a port bypass circuit between a given one of the data storage device ports and the data communication loop to which it is connected so as to allow the data communication loop to be bypassed into the given data storage device port upon operation of the port bypass circuit.

26. The data storage system of claim 22 wherein the fail-over switch comprises:

a. an incoming data terminal for receiving the data request from the data storage controller for transmission to the plurality of storage devices;

b. an outgoing data terminal for receiving a response to the data request;

c. a transmission terminal for communicating, over the first data communication loop, the data request to the plurality of storage devices;

d. a response terminal for receiving, over the first data communication loop, data from the plurality of storage devices;

e. a bypass-transmission terminal for communicating, over the second data communication loop, the data request to the plurality of storage devices;

f. a bypass-response terminal for receiving, over the second data communication loop, data from the plurality of storage devices;

g. a bypass switch that individually and selectively connects the first and second data communication loops to the incoming and outgoing data terminals.

27. The system of claim 26 wherein the bypass switch comprises:

a. a first switch for selectively connecting the incoming data terminal to the transmission terminal or to an intermediate node; and b. a second switch for selectively connecting the intermediate node to the bypass-transmission terminal or to the outgoing data terminal.

28. A data storage system comprising:

a first data communication loop;

a second data communication loop;

a plurality of data storage devices, each storage device having a first and a second port respectively in communication with the first and the second data communication loop; and two port bypass circuits, forming a fail-over switch having (a) an incoming data terminal for receiving a data request for transmission to the plurality of storage devices, (b) an outgoing data terminal for receiving a response to the data request, (c) a first pair of terminals connected to the first data communication loop, and (d) a second pair of terminals coupled to the second data communication loop, for routing a data request to the plurality of data storage devices, wherein the fail-over switch has a first and a second state, where the first state allows communication between the incoming and outgoing terminals with the first data communication loop through the first pair of terminals and where the second state disconnects the incoming and outgoing terminals from the first data communication loop and allows communication between the incoming and outgoing terminals with the second data communication loop through the second pair of terminals.

29. The data storage system of claim 28 wherein the first port bypass circuit includes a data-in port connected to the incoming data terminal, a data-out port and a response-in port connected to the first pair of terminals, and a response-out port and wherein the second port bypass circuit includes a response-in port and a data-out port connected to the second pair of transmission terminals, a data-in port connected to the response-out port of the first port bypass circuit, and a response-out port connected to the outgoing data terminal.

30. The data storage system of claim 28 wherein data travels around the first data communication loop in one direction out of one of the terminals in the first pair of terminals and into the other of the terminals in the first pair of terminals and data travels around the second data communication loop in one direction out of one of the terminals in the second pair of terminals and into the other of the terminals in the second pair of terminals.

31. The data storage system of claim 28 further comprising a port bypass circuit between a given one of the data storage device ports and the data communication loop to which it is connected so as to allow the data communication loop to be bypassed into the given data storage device port upon operation of the port bypass circuit.

32. The data storage system of claim 28 further comprising a data storage controller connected to the incoming data terminal and the outgoing data terminal of the fail-over switch so as to permit communication with the data storage devices through the fail-over switch.

33. The data storage system of claim 28 where, in the first state, the first port bypass switch connects the incoming data terminal to one of the terminals in the first pair of terminals and the second port bypass switch connects an intermediate node to the outgoing data terminal and, in the second state, the first port bypass circuit connects the incoming data terminal to the intermediate node and the second port bypass circuit connects the intermediate node to one of the terminals in the second pair of terminals.

\* \* \* \* \*